United States Patent [19]
Moore

[11] Patent Number: 5,687,443
[45] Date of Patent: Nov. 18, 1997

[54] MOTORIZED JANITORIAL CART WITH ACCESSORIES

[76] Inventor: Terry D. Moore, 2415 Hinton Rd., Dacula, Ga. 30211

[21] Appl. No.: 516,881

[22] Filed: Aug. 18, 1995

[51] Int. Cl.⁶ .................. A47L 11/24; A47L 11/00
[52] U.S. Cl. .................. 15/98; 15/49.1; 15/78; 180/216; 180/210; 280/92
[58] Field of Search .................. 15/98, 49.1, 78, 15/340.1, 340.2, 81, 82, 340.3, 340.4, 87, 79.1, 79.2; 280/92, 96, 96.3, 62; 180/210, 215, 216, 211; 451/350, 351, 352, 353

[56] References Cited

U.S. PATENT DOCUMENTS

| | | | |
|---|---|---|---|
| 2,972,159 | 2/1961 | Swanson et al. | 15/83 |
| 3,391,776 | 7/1968 | Hancock et al. | 280/62 |
| 4,363,152 | 12/1982 | Karpanty | 15/98 |
| 4,367,881 | 1/1983 | Williams | 280/92 |
| 4,535,501 | 8/1985 | Hollowell et al. | 15/340.1 |
| 4,624,026 | 11/1986 | Olson et al. | 15/340.4 |
| 4,654,918 | 4/1987 | Cooper | 15/49.1 |
| 4,989,288 | 2/1991 | Moore | 15/98 |
| 5,265,300 | 11/1993 | O'Hara et al. | 15/98 |
| 5,455,985 | 10/1995 | Hamline et al. | 15/98 |

*Primary Examiner*—Gary K. Graham
*Attorney, Agent, or Firm*—James B. Middleton

[57] ABSTRACT

A janitorial cart is small, and narrow enough for use indoors, and will pass through conventional-width doorways. The cart is electrically powered, and the batteries are mounted very low so the lower center of gravity will stabilize the cart. The steering mechanism utilizes a single, rear wheel that can be turned about 90° in each direction to give the cart a small turning radius. Accessories can be mounted on the front and/or the rear of the cart. The preferred accessory for the front is a dust mop apparatus for dust mopping large floor areas, but it is contemplated that brushes, burnishers and carpet sweepers will also be used. The rear accessory is contemplated to be a container for materials or supplies.

10 Claims, 2 Drawing Sheets

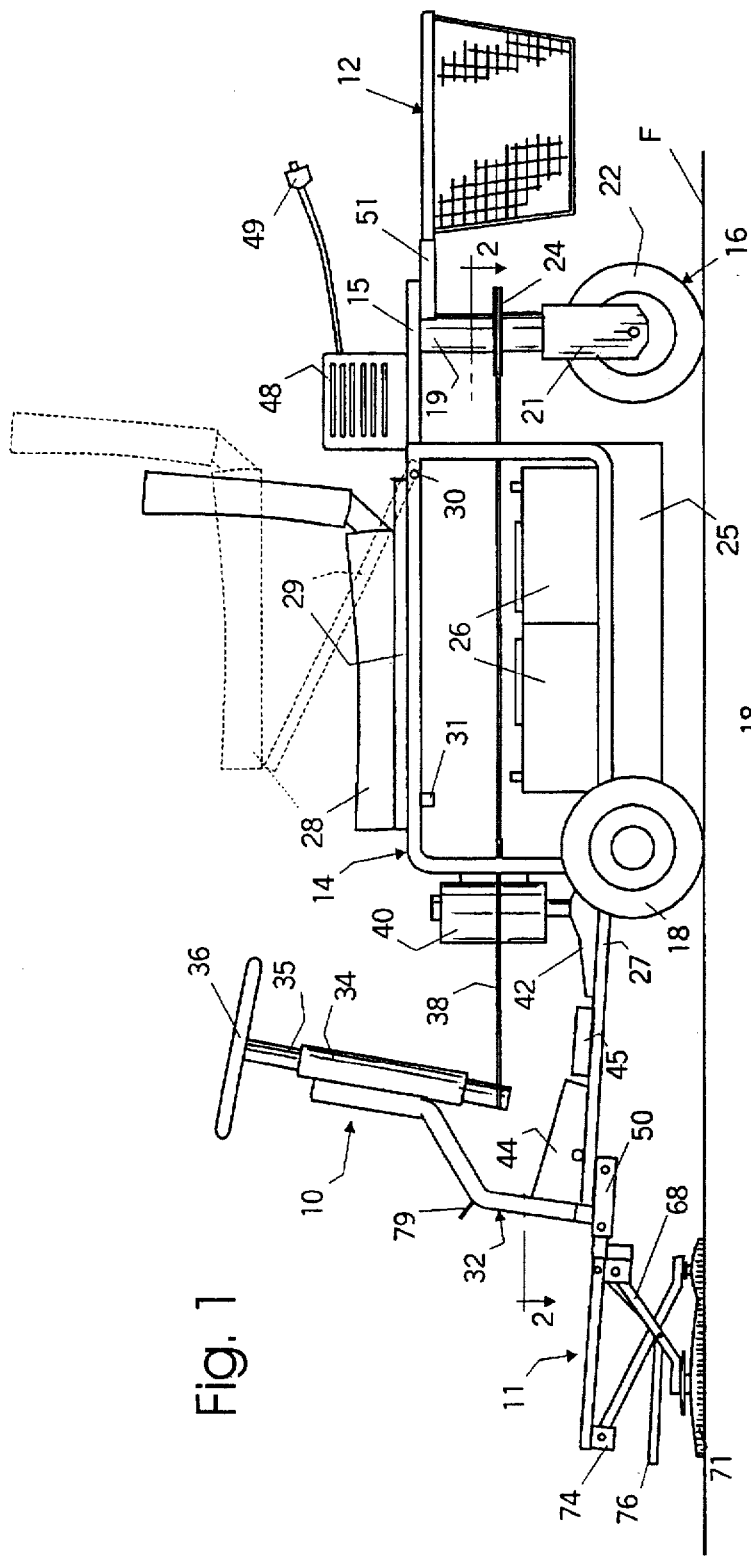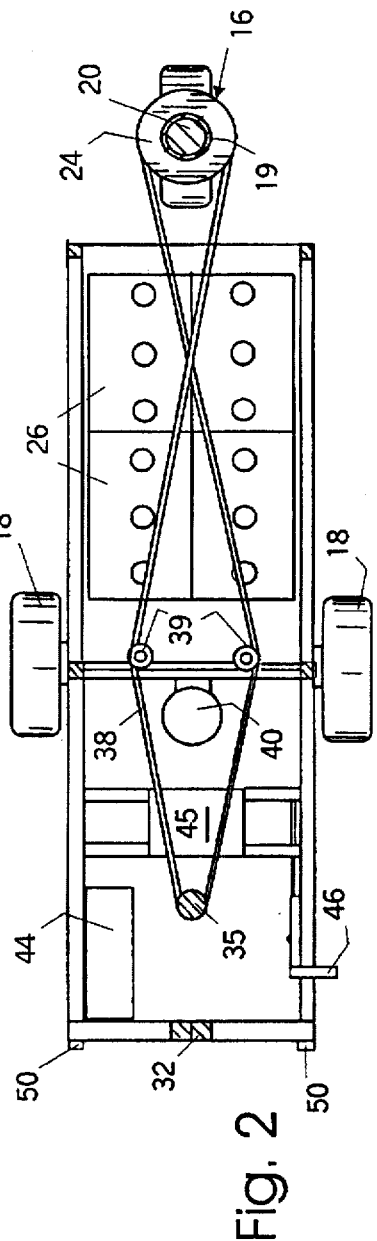

MOTORIZED JANITORIAL CART WITH ACCESSORIES

BACKGROUND OF THE INVENTION

1. Field of the Invention

This invention relates generally to cleaning and dusting apparatus, and is more particularly concerned with a miniature cart carrying various cleaning accessories.

2. Discussion of the Prior Art

There are several cleaning units for cleaning large areas such as large warehouses, parking lots and the like. Such units include self-powered vacuum cleaners having powered brushes and the like, and a dust mop attachment for attachment to a fork lift or other industrial truck as disclosed in U.S. Pat. Nos. 5,165,134; 5,155,884, and 5,165,136. The latter is efficient and economical, but does require a fork lift or other industrial truck for its use.

In smaller, indoor areas, such as department stores, discount stores, schools, shopping malls and the like, the self-contained and self-powered vacuum cleaners are too large and too expensive to be reasonably usable. The dust mop arrangement disclosed in U.S. Pat. Nos. 5,165,134; 5,155,884, and 5,165,136 requires a large industrial truck or the like, and is also not practical for the indoor areas mentioned. Thus, the prior art has not provided a powered, economical sweeping and dusting means for smaller areas.

SUMMARY OF THE INVENTION

The present invention provides a small, self-powered cart having means for receiving a plurality of accessories thereon. The cart is small enough for use in indoor areas, and is preferably narrow enough to pass through standard-width doorways. Dust mop carriers made in accordance with the disclosure in U.S. Pat. Nos. 5,165,134; 5,155,884, and 5,165,136 can be readily mounted on the cart of the present invention, or another accessory may be used; and, an additional accessory can be carried at the rear of the cart. The cart is small, and has a single rear wheel that is used for steering, resulting in a very small turning radius for the cart.

In one embodiment of the invention, the dust mop carrier is pivotable so it can be lifted from the floor for transport across areas that are not suitable for the use of dust mops.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a janitorial cart made in accordance with the present invention, the cart being shown with a front and rear accessory attached thereto;

FIG. 2 is a cross-sectional view taken along the line 2—2 in FIG. 1;

DETAILED DESCRIPTION OF THE EMBODIMENT

Figure 4:
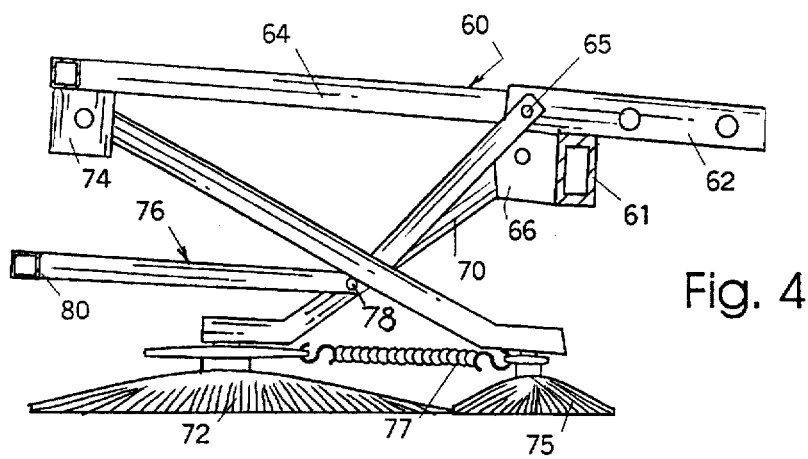
FIG. 4 is an enlarged cross-sectional view taken along the line 4—4 in FIG. 3; and, FIG. 5 is a schematic diagram showing the electrical connections for the cart of FIG. 1.

Referring now more particularly to the drawings, and to that embodiment of the invention here chosen by way of illustration, FIG. 1 shows a janitorial cart generally indicated at 10, and having a front accessory 11 and a rear accessory 12. As here shown, the front accessory 11 is a dust mop carrier with dust mops, which will be described in more detail hereinafter. The rear accessory 12 is simply a basket for carrying supplies and the like.

The cart 10 comprises a rectangular frame 14 having an upper, rearward extension 15. The extension 15 is substantially at the plane of the top of the frame 14, and supports therefrom a single wheel assembly 16. The forward end of the frame mounts a pair of wheels 18, so the cart is supported by three wheels, and steering is by means of the rear wheel assembly 16.

The rear wheel assembly 16 comprises a sleeve bearing 19 which is fixed to the extension 15, depending therefrom. Within the sleeve 19 is a shaft 20 which is fixed to a yoke 21. The yoke 21 mounts the wheel itself, 22. The shaft 20 also has a pulley 24 fixed thereto, the pulley 24 being concentric with the shaft 20 so that rotation of the 24 causes rotation of the shaft 20, hence rotation of the wheel 22 about the centerline of the shaft 20.

The frame 14 has a pan 25 carried at its lower end. The pan 25 provides a lower surface within the frame for supporting batteries 26. Those skilled in the art will understand that many forms of construction can be used, but the object is to place the batteries 26 very close to the floor F, or other supporting surface. Since the cart 10 is electric, batteries must be used, and the arrangement here shown both provides the power needed, and places a good bit of weight quite low in the cart to give the cart a lower center of gravity.

Looking at FIG. 2 of the drawings, it will be observed that the cart is quite narrow. A prototype was constructed having a maximum width of about 29 inches, so the cart can be driven through ordinary-width doorways. Such a narrow width, however, tends to make the cart easy to tip. To counteract this tendency, the batteries, which are lead-acid storage batteries, are placed low in the frame to give the cart stability. With the arrangement shown, it has been found that the cart is quite stable, even during the short-radius turns of which the cart is capable.

It should be understood that the commercially available carts will have body panels to cover the cart for a pleasing appearance, and such panels will restrict access to the operating mechanisms and batteries. To provide convenient access, therefore, the top of the frame 14 is closed by only the seat 28. As is shown in phantom in FIG. 1, the seat 28 can be pivoted away from the frame to provide access to the interior of the frame. The seat 28 has its front edge pivoted to a link 29, the link 29 being pivoted to the rear of the frame at 30. A stop 31 supports the link 29 when the seat 28 is in position for use.

It will therefore be seen that the seat 28 can be lifted and pivoted forward, leaving the link 29 in place; or, the seat 28 can be lifted and urged rearwardly, pivoting the link 29 about the pivot 30. In either case, full access is provided to the interior of the frame 14. The seat can subsequently be easily put back in place for use.

Turning now to the forward end of the cart 19, the frame 14 supports a forward extension 27 from the lower end of the frame 14. As here shown the extension 27 is angled slightly up for comfortable placement of the controls for the cart. At the forward end of the extension 27 there is a stanchion 32 generally perpendicular to the extension 27. The stanchion 32 is off-set rearwardly, and carries a steering column 34. The steering column 34 includes bearings for rotatably mounting a shaft 35 therein. The upper end of the shaft 35 carries a steering wheel 36, and the lower end of the shaft 35 has the steering cable 38 fixed thereto.

With reference to FIGS. 1 and 2 it can be seen that the steering cable 38 extends around the shaft 35 and, since the cable is fixed to the shaft, the cable 38 will be moved in alternate directions as the shaft 35 is rotated in alternate directions. The cable 38 extends rearwardly and passes over pulleys 39 to keep the cable 38 away from the motor 40. The two courses of the cable 38 cross each other, and the cable 38 is fixed to the pulley 24 in the rear wheel assembly 16.

In view of the above described construction, it will be understood that, when the wheel 36 is rotated clockwise, as for a right turn, the shaft 35 will be rotated clockwise as viewed in FIG. 2. The course of the cable 38 on the left side of the cart will be pulled forward, and this will pull the right side of the pulley 24 forward to rotate the wheel 22 counterclockwise. The rear of the cart will therefore move to the left, causing the front end of the cart to move to the right for the expected right turn. It will therefore be understood that the steering system of the present invention is very simple and effective, and allows rotation of the rear wheel 22 about 90° in each direction for a minimum turning radius of the cart.

The motor 40 is an electric motor, and is mounted on the front of the frame 14. The shaft of the motor is connected to a transmission designated at 42. The transmission 42 is a conventional piece of equipment, so no detailed description is required. The transmission 42 is of the type used on lawn mowers and the like, and includes a differential, with shafts extending outwardly to carry drive wheels. In the cart of the present invention,the wheels 18 are mounted on the shafts of the transmission 42, so operation of the transmission 42 is conventional.

An accelerator pedal 44 is placed at the forward, right side of the forward extension 27. This is the location where the accelerator would be expected, so the placement is natural and comfortable. The pedal 44 is a variable resistance as is conventional in electric motor controls; and, there is a motor controller 45, also of conventional design. At the left side of the forward extension there is a brake pedal 46. The pedal 46 simply connects to the transmission 42 to operate the usual braking mechanism included therein.

For convenience in use, it is preferable to include a battery charger on the cart of the present invention. Thus, as shown in FIG. 1, a battery charger 48 is fixed to the rear extension 15. The battery charger 48 will be permanently wired to the electric system so that one needs only to plug the supply cord 49 into a standard outlet, and the batteries 26 will be charged.

The front and rear accessories 11 and 12 are easily attachable to and removable from the cart 10. The front of the cart 10 carries a pair of sleeves 50 for receiving the accessory 11, and the rear of the cart 10 carries a pair of sleeves 51 for receiving the accessory 12. If desired, the sleeves 50 and 51 can be the same size, and spaced the same so accessories are interchangeable between the front and rear. On the other hand, if one wishes to use only certain accessories on the front and others on the rear, the sleeves 50 and 51 can be different so the accessories will not be interchangeable.

Those skilled in the art will readily recognize that the sleeves 51 may be simply the ends of the extension 15. The tubing making up the rear extension 15 can be extended a little further and used as the accessory mount.

Figure 3:
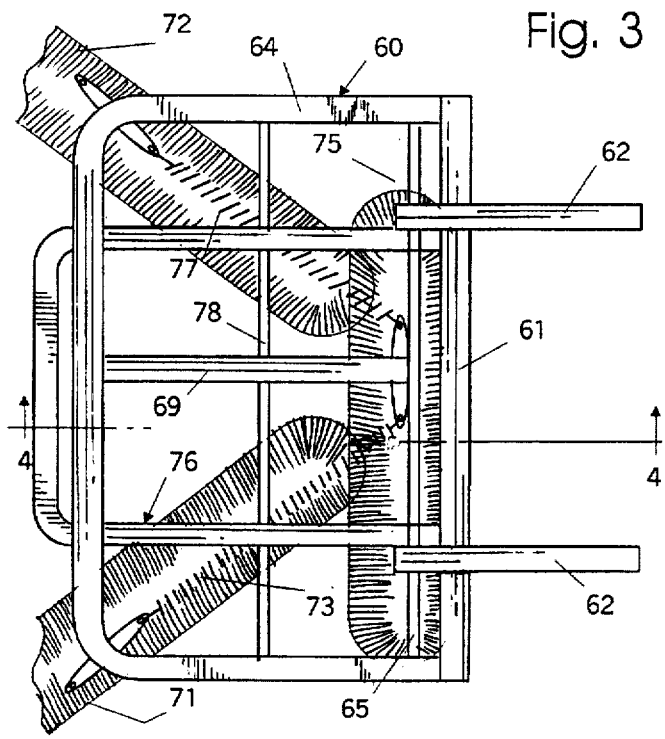
FIG. 3 is an enlarged top plan view of the front accessory shown in FIG. 1.

The dust mop carrier shown in FIGS. 1, 3 and 4 is a slightly modified form of the device of the same inventor disclosed in previously issued patents. The basic device is disclosed in U.S. Pat. No. 4,989,288, issued Feb. 5, 1991. A modified form of the device is shown in U.S. Pat. No. 5,165,134, issued Nov. 24, 1992. Bumpers for the mop frames are shown in U.S. Pat. No. 5,155,884, issued Oct. 20, 1992; and, a novel mop head for use with the bumpers is disclosed in U.S. Pat. No. 5,165,136, issued Nov. 24, 1992. All these patent disclosures are incorporated herein by reference. Those skilled in the art will understand that any of these devices can be incorporated into a mop carrier for use with the cart of the present invention, the cart being in essence a small industrial truck.

The cart of the present invention does not have movable forks or the like for adjusting the height of the mop carrier in accordance with the disclosures in the above identified patents, so some modification was needed. The height of the sleeves 50 is set at a good height for the carrier frame 60; however, some means is still desirable to lift the mops from the floor for transport, for example across carpeted areas, or areas of rough concrete or the like.

Looking primarily at FIGS. 3 and 4 of the drawing, it will be seen that the primary support structure of the mop carrier includes a transverse beam 61 having shafts 62 fixed perpendicularly thereto. The shafts 62 are properly placed and sized to be received in the sleeves 50. A rectangular frame 64 is carried by the support structure by means of a pintle 65. The pintle 65 extends through holes in the forward ends of the shafts 62, and through the ends of the frame 64. As a result of this construction, it will be understood that the frame 64 can be pivoted up, clockwise as shown in FIGS. 1 and 4. Downward pivoting, counterclockwise, is limited because the flanges 66 are fixed to the frame 64, and engage the beam 61.

When the frame 64 is in its most downward position, it is oriented to carry the dust mops for the preferred contact with the floor. As is disclosed in U.S. Pat. No. 4,989,288, there are three arms 68, 69 and 70. The arms 68 and 70 are pivoted from the flanges 66 which are fixed to the rear edge of the frame 64. The arms 68 and 70, then, extend angularly down and forward and mount dust mops 71 and 72 at their lowermost ends. The arm 69 is pivoted from flanges 74 generally centrally of the frame 64, at the front edge thereof, and extends angularly down. The arm 69 carries a dust mop 75 at its lower end. Springs 73 and 77 hold the dust mops in position. This construction is as in the U.S. Pat. No. 4,989,288 and should be well understood.

The apparatus of the present invention includes a control frame designated at 76. The frame 76 is pivoted to the pintle 65 and angles down. A control pin 78 passes through the arms 68 and 70, and the frame 76 extends to this pin so the control pin also passes through the control frame 76. From the pin 78, the frame 76 extends forward, generally horizontally. It will be noted that the pin 78 passes below the arm 69.

With the described construction, it will be understood that one can grasp the forward edge of the control frame 76 and lift. The pin 78 will prevent the arms 68 and 70 from dropping down because the pin 78 passes through the arms. The pin 78 will also keep the arm 69 from dropping down because the arm 69 is above the pin. Thus, the entire assembly will rotate about the pintle 65. When the dust mops are to be removed from contact with the floor F, the assembly will be rotated up as described; and, the forward end of the control frame 76 will engage a tab 79 on the stanchion 32 (FIG. 1). A pin can be passed through the tab 79 and the hole 80 in the control frame to hold the assembly in position. It should also be recognized that the front end of the control frame 76 can act as a handle for manually carrying the dust mop assembly. When the frame 76 is grasped, the assembly will assume a vertical position, and the control frame 76 with the control pin 78 will hold the frame 64 and arms together conveniently.

Figure 5:
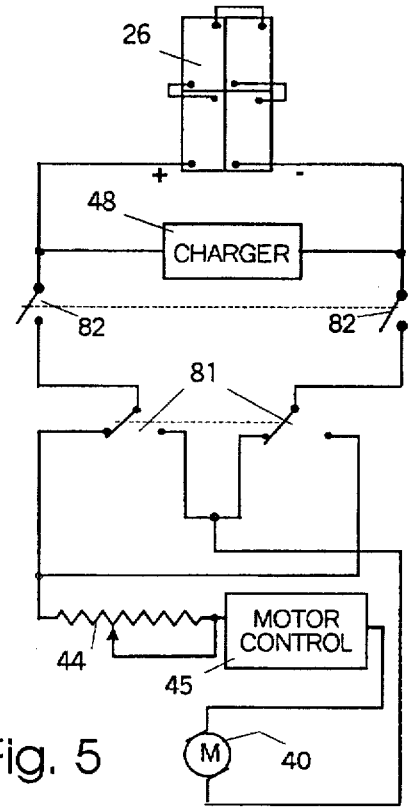

The controls for the cart of the present invention are shown schematically in FIG. 5 of the drawings. The batteries 26 are shown connected in series, so four six-volt batteries will provide 24 volts to operate the motor 40. A main switch 82 will preferably be a keyed switch to turn the device on and off. The switch 80 is a double-pole-single-throw, and will be mounted conveniently, such as on the steering column. There is another switch 81 in series with the switch 80, the switch 81 being to select forward or reverse. The switch 81 is a conventional double-pole-double-throw switch for reversing the polarity of the motor 40. The switch 81use. Then, in s as desired for convenient use. Then, in series with the switch 81 there is the potentiometer 44 for varying the speed, through the controller 45, of the motor 40.

The battery charger 48 is connected in parallel with the batteries 26, so one needs only to plug in the power cord to charge the batteries 26.

It will therefore be seen that the present invention provides a cart, or miniature industrial truck, that can be used in relatively small spaces for cleaning, transporting material and the like. The cart is narrow enough to pass through standard doorways, and is maneuverable enough for use in small spaces. The cart can carry dust mops for floors, or may carry brushes, carpet sweepers, burnishers or the like for cleaning and/or polishing various surfaces. The rear accessory may be a simple basket for carrying supplies, or may be a more specialized container for restroom cleaning supplies or the like. Those skilled in the art will readily devise numerous forms of accessories for use with the cart of the present invention.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A cart, for use as a janitorial cart, said cart comprising a frame having a top surface, a front end, a rear end and spaced sides,said top surface defining a plane, a rear end and spaced sides, said top surface defining a plane, a rear extension extending in the plane of said top surface and extending rearwardly thereof, a wheel assembly fixed to said rear extension and depending therefrom, said wheel assembly comprising a single wheel placed generally along a longitudinal centerline of said frame, a pair of wheels adjacent to said front end of said frame, one wheel of said pair of wheels being mounted on each side of said frame, a forward extension having a front and a rear, said forward extension from said front end of said frame, seating means carried on said top surface of said frame, drive means mounted to said frame for causing rotation of said pair of wheels, steering means mounted to said forward extension for selectively rotating said single wheel about a vertical axis, control means for said drive means mounted on said forward extension, a pan carried by said frame, power supply means secured within and to said pan and coupled with said drive means, and accessory attaching means selectively attaching a cleaning accessory to the front of said forward extension for cleaning a floor.

2. A cart as claimed in claim 1, said cart having a width sufficiently narrow to fit through a conventionally-sized doorway.

3. A cart as claimed in claim 2, wherein said drive means comprises an electric motor, a transmission having a pair of axles, said pair of wheels being mounted on said pair of axles, said electric motor being drivingly connected to said transmission, and said power supply means comprising batteries.

4. A cart as claimed in claim 3, and further including pivot means for connecting said seat means to said frame, the pivot means being such that said seat means can be pivoted to provide access to an interior of said frame.

5. A cart as claimed in claim 3, and further including a battery charger carried by said cart, circuit means for electrically connecting said charger to said batteries, and a power cord for energizing said charger.

6. A cart as claimed in claim 1, and further including a rear accessory attaching means for selectively attaching an accessory to said rear extension of said cart.

7. A cart as claimed in claim 1, wherein said cleaning accessory comprises a dust mop carrier including a first dust mop extending transversely of said cart, said first dust mop having a front and left and right sides, a second dust mop extending angularly to the front and left of said first dust mop, and a third dust mop extending angularly to the front and right of said first dust mop, and spring means for maintaining an orientation of said dust mops with respect to each other.

8. A cart as claimed in claim 7, said dust mop carrier further including a first arm pivoted to said carrier and carrying said first dust mop at a lower end thereof, said first arm being pivoted generally centrally of said carrier, a second arm pivoted to said carrier and carrying said second dust mop at a lower end thereof, said second arm being pivoted to a left side of said carrier, and a third arm pivoted to said carrier and carrying said third dust mop at a lower end thereof, said third arm being pivoted to a right side of said carrier.

9. A cart as claimed in claim 8, said carrier being pivoted with respect to said forward extension for lifting said dust mops from the floor, and latching means for securing said carrier in the pivoted position.

10. A cart as claimed in claim 1, said accessory attaching means comprising a pair of sleeves fixed to said forward extension, and further including rear accessory attaching means for attaching an accessory to the rear of said cart, said rear accessory attaching means comprising a pair of sleeves fixed to said rear extension.

* * * * *

UNITED STATES PATENT AND TRADEMARK OFFICE
CERTIFICATE OF CORRECTION

PATENT NO. : 5,687,443
DATED : November 18, 1997
INVENTOR(S) : Terry D. Moore

It is certified that error appears in the above-identified patent and that said Letters Patent are hereby corrected as shown below:

In claim 1, line 48, delete "a rear end and";
        line 49 delete "spaced sides...a plane,".

Signed and Sealed this

Tenth Day of February, 1998

Attest:

BRUCE LEHMAN

Attesting Officer     *Commissioner of Patents and Trademarks*